United States Patent
Piret et al.

(10) Patent No.: US 8,386,901 B2
(45) Date of Patent: Feb. 26, 2013

(54) METHOD, DEVICE AND SOFTWARE APPLICATION FOR TRANSMITTING DATA PACKETS IN A COMMUNICATION SYSTEM

(75) Inventors: Philippe Piret, Lasne (BE); Philippe Le Bars, Thorigne Fouillard (FR); Julien Sevin-Renault, Corce (FR)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 12/441,101

(22) PCT Filed: Sep. 26, 2007

(86) PCT No.: PCT/EP2007/060231
§ 371 (c)(1),
(2), (4) Date: May 15, 2009

(87) PCT Pub. No.: WO2008/037750
PCT Pub. Date: Apr. 3, 2008

(65) Prior Publication Data
US 2009/0271681 A1    Oct. 29, 2009

(30) Foreign Application Priority Data

Sep. 26, 2006  (FR) .................................... 06 08633

(51) Int. Cl.
*G06F 11/00* (2006.01)
(52) U.S. Cl. .......................... 714/800; 714/779; 714/760
(58) Field of Classification Search ................. 714/800, 714/760, 779, 755, 39
See application file for complete search history.

(56) References Cited

U.S. PATENT DOCUMENTS

| | | | | |
|---|---|---|---|---|
| 4,630,271 A * | 12/1986 | Yamada | ........................ | 714/760 |
| 4,852,088 A * | 7/1989 | Gulick et al. | ................. | 370/413 |
| 5,867,508 A | 2/1999 | Piret | | |
| 6,081,650 A * | 6/2000 | Lyons et al. | ................. | 386/240 |
| 6,167,515 A * | 12/2000 | Lin | ............................... | 713/160 |
| 2002/0114283 A1 | 8/2002 | Lee | | |
| 2003/0002502 A1 | 1/2003 | Gibson et al. | | |
| 2003/0129966 A1 | 7/2003 | Le Bars et al. | | |

FOREIGN PATENT DOCUMENTS
GB    2216752    10/1989

OTHER PUBLICATIONS

J. Rosenberg, et al., "RFC 2733: An RTP Payload Format for Generic Forward Error Correction", Dec. 1999 http://www.faqs.org/rfcs/rfc2733.html.
J. Blomer, et al., "An XOR-Based Erasure-Resilient Coding Scheme", Aug. 1995.

* cited by examiner

*Primary Examiner* — Fritz Alphonse
(74) *Attorney, Agent, or Firm* — Fitzpatrick, Cella, Harper & Scinto (57) ABSTRACT

A transmitting apparatus transmits a plurality of data packets to a receiver in a communication system, by transmitting one or more data packets from a list of data packets to be transmitted, and determining whether an acknowledgment is received for each transmitted data packet. When it is determined that an acknowledgement has not been received for at least one data packet, referred to as an unacknowledged data packet, the apparatus selects one or more additional data packets from the list of data packets to be transmitted, generates one or more parity packets by encoding a block of data containing a combination of the selected one or more additional data packets and at least one unacknowledged data packet using a forward error correction scheme, and transmits at least one of the generated parity packets.

17 Claims, 5 Drawing Sheets

METHOD, DEVICE AND SOFTWARE APPLICATION FOR TRANSMITTING DATA PACKETS IN A COMMUNICATION SYSTEM

BACKGROUND OF THE INVENTION

1. Technical Field of the Invention

The present invention relates to data communication systems. The present invention is especially applicable for transmitting data packets in such communication systems.

2. Description of the Background Art

Error control techniques are extensively used in data communication systems to restore data integrity when data is corrupted by transmission errors or is lost. Automatic-Repeat-Request (ARQ) schemes are retransmission-based error control mechanisms commonly used to deliver highly reliable data to destination.

In ARQ, an error-detecting code, a checksum for example, is used in combination with a certain retransmission protocol. Corrupted or lost data packets are transmitted repeatedly until correctly received by the receiver. Feedback information (acknowledgments), sequence numbering and timers are used to ensure correct delivery of data packets at the receiver.

TCP (Transport Control Protocol) is an example of a widely used protocol implementing an ARQ error-control mechanism. In this protocol, the sending device uses acknowledgments (ACKs) it receives to determine which data packets (segments) have reached the receiver, and provides reliability by retransmitting lost packets. The sending device identifies the loss of a packet either by the arrival of several acknowledgments acknowledging a same data packet (duplicate ACKs) or the absence of an acknowledgment for the packet before a timeout. At the receiving device, the sequence numbers are used to correctly order packets that may be received out of order and to eliminate duplicates. Damage is handled by adding parity data using an error detecting code (checksum) to each packet transmitted, checking it at the receiver, and discarding damaged packets.

One common drawback of retransmission-based error control mechanisms, including TCP one, is that the acknowledgment packets also suffer from the impairments of the communication channel. The sending device has to decide if an already transmitted data packet shall be retransmitted or not based on the available feedback information, and the unreliability of that feedback information may cause unnecessary retransmission of data packets and creation of duplicates at the receiver. In addition to a waste of channel bandwidth, duplication of data packets may further degrades transmission conditions in the communication system by aggravating congestions for example.

There exist various conditions under which even a well designed ARQ protocol leads to the reception of multiple copies of a data packet at the receiver.

For example, it may happen that an acknowledgment packet is lost. In this case, even if the data packet is correctly delivered to the receiving device, the sending device is not aware of such delivery and thus retransmits the data packet after timeout. If the retransmission is successful, the data packet is delivered twice to the receiver.

Another example relates to the use of independent error control mechanisms at different layers. Consider an end-to-end reliable transport protocol, such as TCP, which is tuned to perform well in traditional networks where packet losses occur mostly because of congestion. When some links are wireless or use any other lossy channel, they suffer from significant losses due to bit errors. Because of the significant time required to recover from losses at the link layer (generally, wireless network standards accept up to 16 retransmissions), acknowledgment or data packets belonging to the end-to-end protocol might be delayed more than usual. Even if the data packets finally reach the receiver or the corresponding acknowledgement packets reach the sending device, it's likely that the data packets are assumed to be lost by the sending device and retransmitted.

Yet another example relates to variable transmission delay that different packets may experience in a multi-path communication system which causes out of sequence reception of packets. Different packets may be transmitted over different paths. Each path may contain a different number of intermediate devices (hubs, switches, routers, and so on) and each device may be working at a different processing speed. Packets following congested paths or transferred via intermediate devices having low processing speed could experience long delays and thus can be considered as lost by end devices. TCP, for example, maintains a running average of the estimated roundtrip delay and the mean linear deviation from it. The sending device identifies the loss of a packet either by the arrival of several duplicate acknowledgments (this may happen if a packet is delayed for too long) or the absence of an acknowledgment for the packet within a predetermined period of time equal to the sum of the smoothed round-trip delay and four times its mean deviation.

SUMMARY OF THE INVENTION

The present invention has been made for enhancing the performance of the communication system by avoiding useless retransmissions. Particularly, the present invention intends to solve the problem of receiving multiple copies of a packet at the receiver end.

According to a first aspect of the present invention, there is provided a method for transmitting a plurality of data packets to a receiver in a communication system comprising the steps of transmitting by a transmitter one or more data packets from a list of data packets to be transmitted and determining whether an acknowledgment is received for each transmitted data packet. When it is determined at the determining step that an acknowledgement has not been received for at least one data packet, referred to as an unacknowledged data packet, the following steps are executed: selecting one or more additional data packets from the list of data packets to be transmitted; generating one or more parity packets by encoding a block of data containing a combination of the selected one or more additional data packets and at least one unacknowledged data packet using a forward error correction scheme; and transmitting at least one of the generated parity packets.

An advantage of this method is that if the unacknowledged data packets were actually correctly received by the receiver, they will be used in combination with the parity packets to recover the additional one or more data packets that were not, and will never be, transmitted. No duplicated packets are thus received by the receiver and all transmitted information is exploited to generate the additional data packets.

Advantageously, the transmitting method further comprises the steps of determining whether an acknowledgment is received for each data packet contained in the block of data, and transmitting at least one of the selected data packets if at least one data packet contained in said block of data is unacknowledged.

Parity packets are thus used by the receiver to recover the unacknowledged data packets, if they were indeed not correctly received, using the selected data packets transmitted later on by the transmitter. Again, no duplicated packets are received by the receiver and all transmitted information is exploited to recover the unacknowledged data packets.

According to a preferred embodiment of the invention, the forward error correction scheme uses a maximum distance separable (MDS) code. With such a code, one parity packet contains enough information to recover one data packet. It is thus easier to determine how many parity packets need to be transmitted by the transmitter considering the number of unacknowledged data packets in order for the receiver to have just the necessary and sufficient information to recover all the data packets. Furthermore, MDS codes are efficient codes.

In a particular mode of implementation, the number of parity packets transmitted at the transmitting step is at least equal to the number of unacknowledged data packets used to generate said parity packets. Thus, the receiver is able to recover all the unacknowledged data packets if they have actually not been received.

According to a preferred mode of implementation, the number of parity packets transmitted at the transmitting step, the number of unacknowledged data packets used to generate said parity packets and the number of selected data packets are all equal which makes the management of the transmission of parity and data packets simple.

According to a preferred embodiment of the invention, one parity packet is generated by computing a bitwise XOR of one selected data packet and one unacknowledged data packet. Very simple coding can thus be obtained of the data packets.

According to another embodiment of the invention, the parity packets are generated by applying a Reed-Solomon code over a Galois field of size $2^m$, m being the number of binary elements of the symbols of the code, wherein said code is used for encoding each word j formed by the concatenation of the jth symbol of each data packet. Reed-Solomon codes are well known MDS codes that provide efficient encoding.

According to a second aspect of the present invention, there is provided a method for receiving a plurality of data packets from a transmitter in a communication system comprising the steps of: receiving one or more parity packets from the transmitter, said parity packets having been generated by encoding, using a forward error correction scheme, a block of data containing a combination of a first set of data packets transmitted by the transmitter and a second set of data packets to be transmitted by said transmitter; partially reconstructing an encoded block of data associated to the one or more received parity packets based on received data packets belonging to the first and second sets of data packets; determining whether the block of data can be recovered by decoding the encoded block of data reconstructed at the reconstructing step; and if the block of data can be recovered, sending to the transmitter an acknowledgement corresponding to each data packet included in said recovered block of data.

The invention also relates to software applications for transmitting a plurality of data packets and for receiving them.

Furthermore, the invention relates to a transmitting device and a receiving device implementing respectively the software application for transmitting the plurality of data packets and the software application for receiving those data packets, and to a memory medium for storing the code of such software applications.

DETAILED DESCRIPTION OF THE EMBODIMENTS

In the following, a detailed description will be given of embodiments of the present invention with reference to the accompanying drawings.

Figure 1:
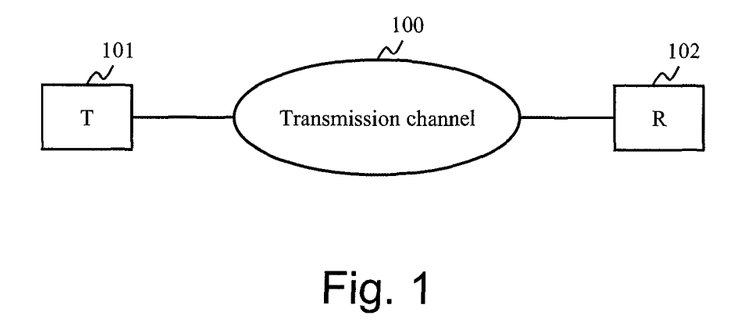
FIG. 1 is an example of a communication system where the present invention can be implemented.

FIG. 1 is an example of a communication system where the present invention can be implemented. A sending device (101) transmits a plurality of data packets to a receiving device (102) through a transmission channel (100) that may drop or corrupt the data packets. Feedback information is transmitted from the receiving device to the sending device in order to provide status information on the received data packets. The present invention according to its first aspect is implemented at the sending device for transmitting the plurality of data packets and according to its second aspect is implemented at the receiving device for receiving the plurality of data packets.

Figure 2:
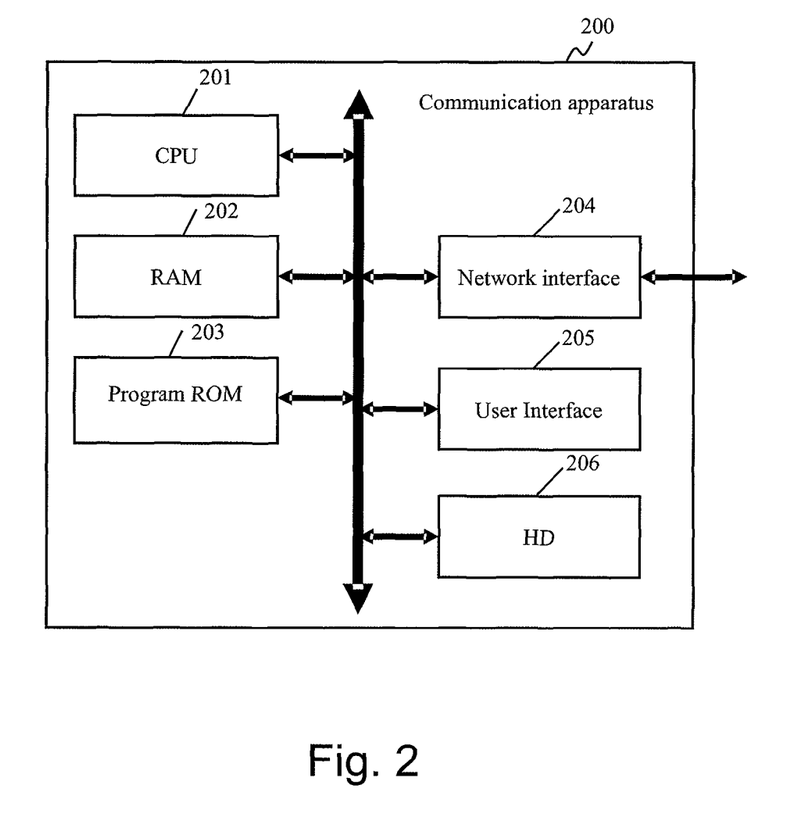
FIG. 2 is a block diagram illustrating a schematic configuration of a communication apparatus representing a transmitting device or a receiving device adapted to incorporate the invention.
Figure 7:
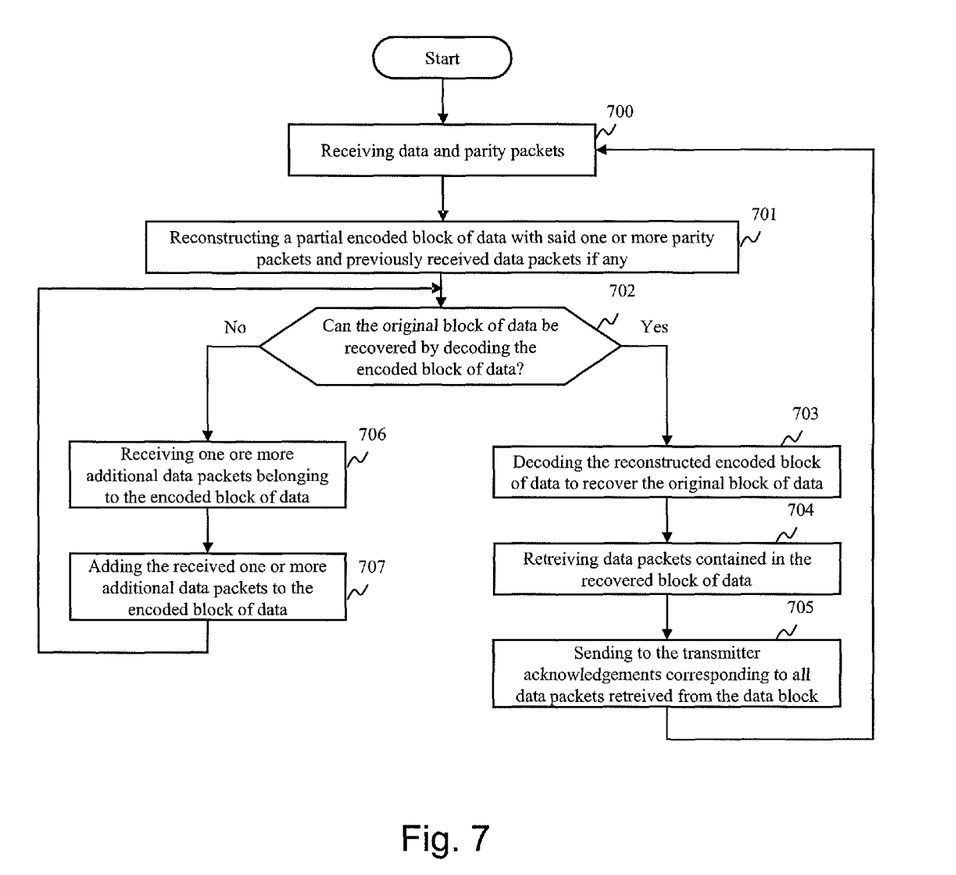
FIG. 7 is a flowchart illustrating a receiving method of packets according to the present invention as to be implemented at the receiving device.

FIG. 2 is a block diagram illustrating a schematic configuration of a communication apparatus representing a transmitting device or a receiving device adapted to incorporate the invention. Reference numeral 202 is a RAM which functions as a main memory, a work area, etc., of CPU 201, and the memory capacity thereof can be expanded by an optional RAM connected to an expansion port (not illustrated). CPU 201 is capable of executing instructions on powering up of the communicating apparatus from program ROM 203. After the powering up, CPU 201 is capable of executing instructions from main memory 202 relating to a software application after those instructions have been loaded from the program ROM 203 or the hard-disc (HD) 206 for example. Such software application, when executed by the CPU 201, causes the steps of the flowcharts shown in FIG. 3 and/or 7 to be performed.

Reference numeral 204 is a network interface that allows the connection of the communication apparatus to the communication channel. Data packets are written to the network interface for transmission or read from the network interface for reception under the control of the software application running in the CPU 201. Reference numeral 205 represents a user interface to display information to, and/or receive inputs from, a user.

Figure 3:
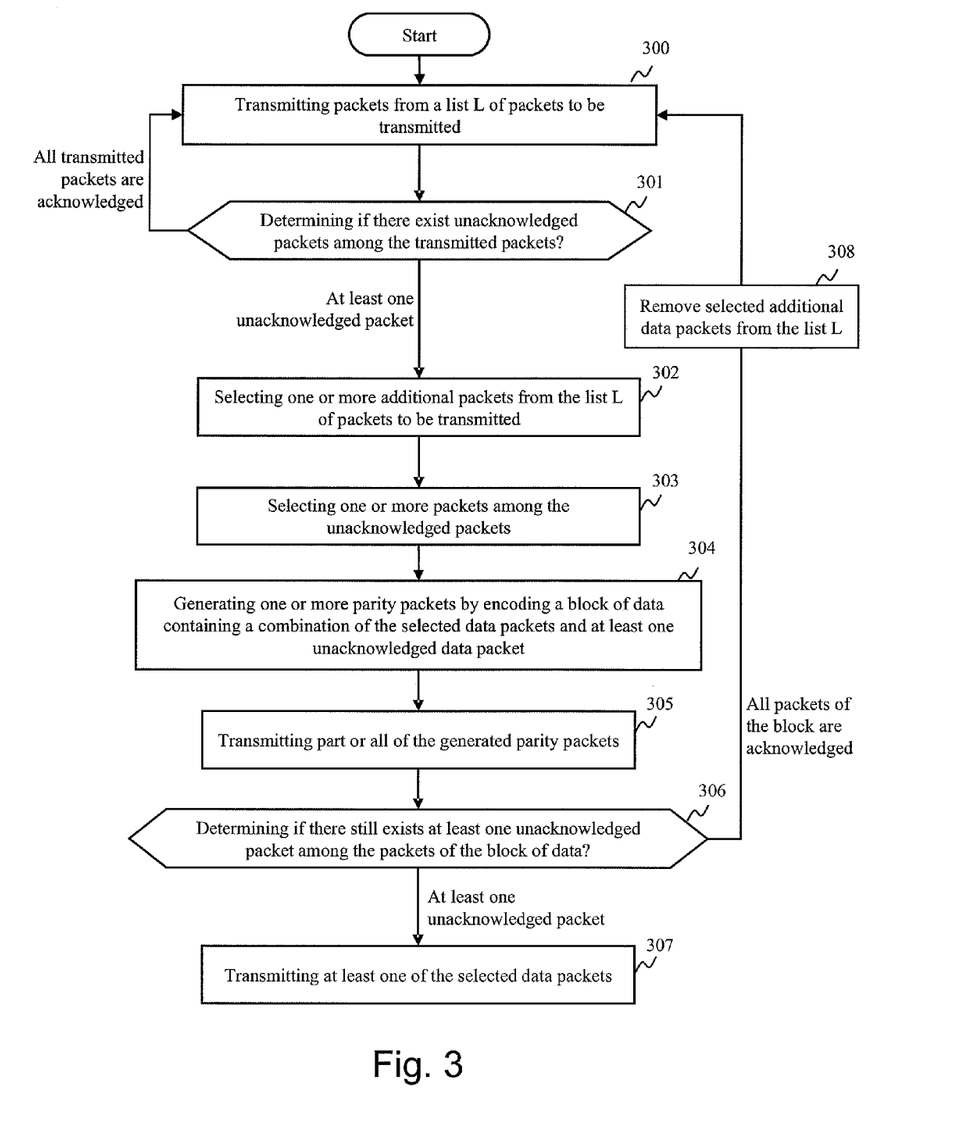
FIG. 3 is a flowchart illustrating a transmitting method of data packets according to the present invention as to be implemented at the sending device.

The transmitting method of packets according to the present invention as to be implemented at the sending device is illustrated by the flowchart of FIG. 3. This method allows the transmission of packets from a list L of packets to be transmitted.

The list L represents for example a buffer memory containing packets of data. A packet is written in the buffer if it is to be transmitted, and is removed from the buffer after being transmitted. Consequently, the buffer memory, and thus the list L, is assumed to be continuously updated by the sending device in order to contain only packets that are waiting for transmission. The way of implementing the list L described above is not limitative and any other implementation can be used, such as using one buffer memory for storing all packets and tagging those that are waiting for transmission.

The sending device transmits data packets from the list L (step 300) to the receiving device and monitors the received acknowledgments to determine if there exists any unacknowledged data packets (step 301). It should be noted that the conditions under which a packet is considered as unacknowledged remain the same as those known to skilled persons in the art when implementing retransmission based protocols. Those conditions include, obviously, the absence of acknowledgement within a predetermined period of time, but could be also any other protocol-dependent conditions such as receiving multiple acknowledgements for a given packet or any specific feedback signalling from the receiving device.

For example, the determining step 301 may comprise a step of measuring elapsed time since transmitting a data packet, said data packet being considered as unacknowledged if the elapsed time is greater than a predetermined value. In an alternate embodiment, the determining step may comprise a step of counting the number of acknowledgements received for data packets transmitted after the transmission of a given data packet, said given data packet being considered as unacknowledged if the counted number is greater than a predetermined value.

If it is determined at the determining step 301 that all transmitted data packets have been acknowledged, the sending device continues transmitting data packets from the list L, if packets waiting for transmission remain. However, if it is determined that at least one data packet is unacknowledged, a recovery procedure is executed according to the present invention following the steps 302 to 307.

The pace at which the steps 300 and 301 are executed depends on the design choice of the communication protocol (window size, etc.). It is possible for the sending device to continuously monitor any received acknowledgment.

At step 302, one or more data packets are selected from the list L of packets to be transmitted. Let k1 be the number of those selected data packets, where k1 is an integer greater than or equal to 1. At step 303, one or more packets are selected among the unacknowledged packets. Let k2 be the number of those selected unacknowledged packets, where k2 is an integer greater than or equal to 1.

The step 304 of generating parity packets is as follows. The k1 data packets to be transmitted and the k2 unacknowledged packets are combined to form a block of data of size k=k1+k2 packets. The block of data is afterwards encoded using a forward error correcting (FEC) code to form an encoded block of data of size n=k+h packets, where h is the number of parity packets generated by the FEC code. The parity packets, when correctly received by the receiving device, can be used to recover one or more missing data packets if is it within the correcting capacity of the code.

Taking into account the capacity of the code, a number h1 (h1<h) of parity packets is transmitted at step 305 to the receiving device, h1 being such that it is just enough to recover the k1 packets considering that all k2 unacknowledged packets have actually been correctly received by the receiving device. Consequently, duplicated packets are avoided at the receiving device. If however it happens that part or all of the k2 unacknowledged packets were actually not received by the receiving device, the sending device will transmit the required number of data packets chosen among the k1 packets to be transmitted for the receiving device to be able to recover the initially not received part or all of the k2 packets.

The number of generated parity packets (h) and the number of transmitted ones (h1) are preferably equal, but it is not a requirement. A given forward error correcting scheme may generate more parity packets than necessary and part of them may be enough to implement the transmitting and receiving methods according to the present invention.

The sending device determines at the step 306 if all the k1 and k2 packets forming the block of data have been acknowledged. The sending device has to wait preferably until a timeout associated to the last transmitted parity packet is detected, to reduce the probability of missing an acknowledgment.

If all the data packets (k) of the data block have been acknowledged, the recovery of the k1 data packets was successful, and then those data packets are removed from the list L of data packets to be transmitted (step 308). Afterwards, the step 300 of transmitting data packets from the updated list L is executed.

If not all the data packets (k) of the data block have been acknowledged, the sending device transmits at least one of the selected k1 data packets at a step 307.

More details on the encoding scheme of the data block are provided hereinafter.

Figure 4:
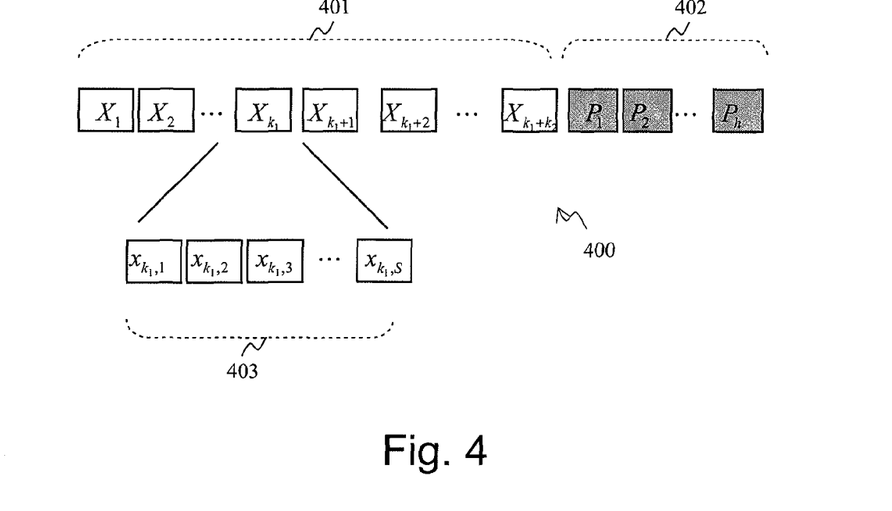
FIG. 4 depicts the format of an encoded block of data.

FIG. 4 depicts the format of an encoded block of data (400) encoded by using a systematic block code. Reference 401 indicates the k=k1+k2 data packets ($X_i$) forming the data block, and reference 402 refers to the h parity packets ($P_i$) generated by the encoding of the data block. All packets are assumed to have a fixed size of S symbols ($x_{i,j}$) as indicated by reference 403. This is not however a requirement, since padding data can be used to obtain fixed size packets.

Typically, a block code C takes a K-symbols information word and transforms this into an N-symbols codeword, where N>K and N-K representing the amount of redundancy added by the code. The symbols are elements of an "alphabet" of finite size. The most common symbols are binary elements belonging the alphabet {0, 1} of size 2, and bytes (8 bits) belonging to the alphabet {0, . . . , 255} of size $2^8$=256.

The correcting capacity of a code is defined by its minimum distance D and depends on the rate of the code (K/N) and how the parity symbols are generated from the information symbols. The greater the minimum distance, the higher is the correcting capacity of the code. The highest correcting capacity is obtained when D=N−K+1. Codes providing such minimum distance are called maximum distance separable (MDS) codes. A Reed-Solomon code is an example of an MDS code.

Different techniques can be used to generate parity packets from a plurality of data packets using a code C(N, K).

A first technique is to encode the data packets at a symbol level by choosing the parameters K=k*S and N=n*S of the code C(N, K). This technique requires the use of a long length code if the number k of packets to encode is high. For example, if the size of a packet is 512 bytes (a byte representing a symbol), a code C(3072, 2048) would be needed in order to generate two parity packets from four data packets (k=4).

A second technique consists of increasing the symbol size (number of binary elements) to reduce the number of symbols per packet, the upper limit being equal to the size of one packet. This technique may lead to a tremendously large alphabet making the encoding and decoding processes complex (a symbol of size 2 bytes corresponds to an alphabet of size $2^{16}$=65536).

Figure 5:
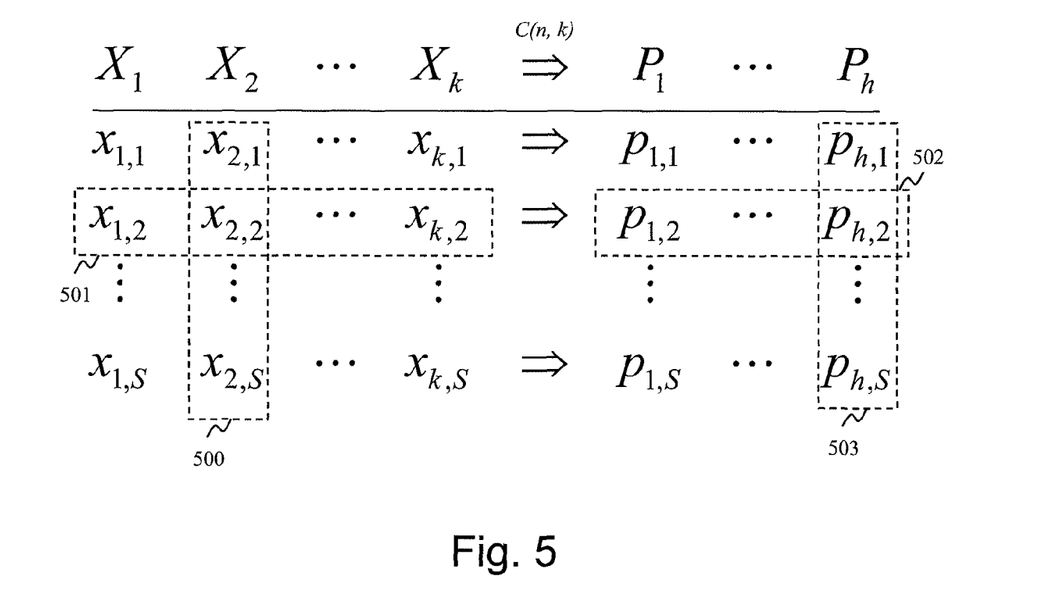
FIG. 5 depicts an example of an encoding scheme of data packets.

In a preferred embodiment, a third technique is used for the encoding of data packets. The encoding scheme principle based on this technique is depicted in FIG. 5.

The k data packets ($X_i$) are organized into a matrix where each column corresponds to a data packet (500) and where each line (501) is formed by a plurality of symbols ($x_{i,j}$), each of them taken at a given position (j) from every data packet. Each line of k symbols is encoded with a code C(n, k) to generate n−k=h parity symbols (502). The parity symbols are also organized into a matrix where each column (503) represents a parity packet. This technique allows the use of conventional codes to encode a plurality of data packets of arbitrary size by applying the code C(N=n, K=k) S times, where the number (k) of data packets per data block equates the number of symbols per information word to be encoded.

The encoder has to inform the decoder about the coding parameters. The parameters N and K of the code can be set once for all and shared during a setting step between the encoder at the sending device and the decoder at the receiving device. The number of data packets in the data block (k) can also be set to a fixed size or kept dynamic from one data packet to another. It should be noted that even if a data block of shorter size, i.e. k0<k, is used at a given time, it's still possible to use the same encoding and decoding hardware C(N, K) as the one for a data block of size k by using code shortening techniques known to persons skilled in that art.

Protocol related control information need also be exchanged between the sending device and the receiving device. Such control information allows the sending device to tell the receiving device exactly which data packets have been used to generate which parity packets, and makes the receiving device distinguish between packets belonging to different encoded data blocks when transmitted consecutively.

A packet, either data or parity, contains a payload field and a header field. The payload field contains information meaningful for higher applications, the header field contains mainly control information.

Figure 6:
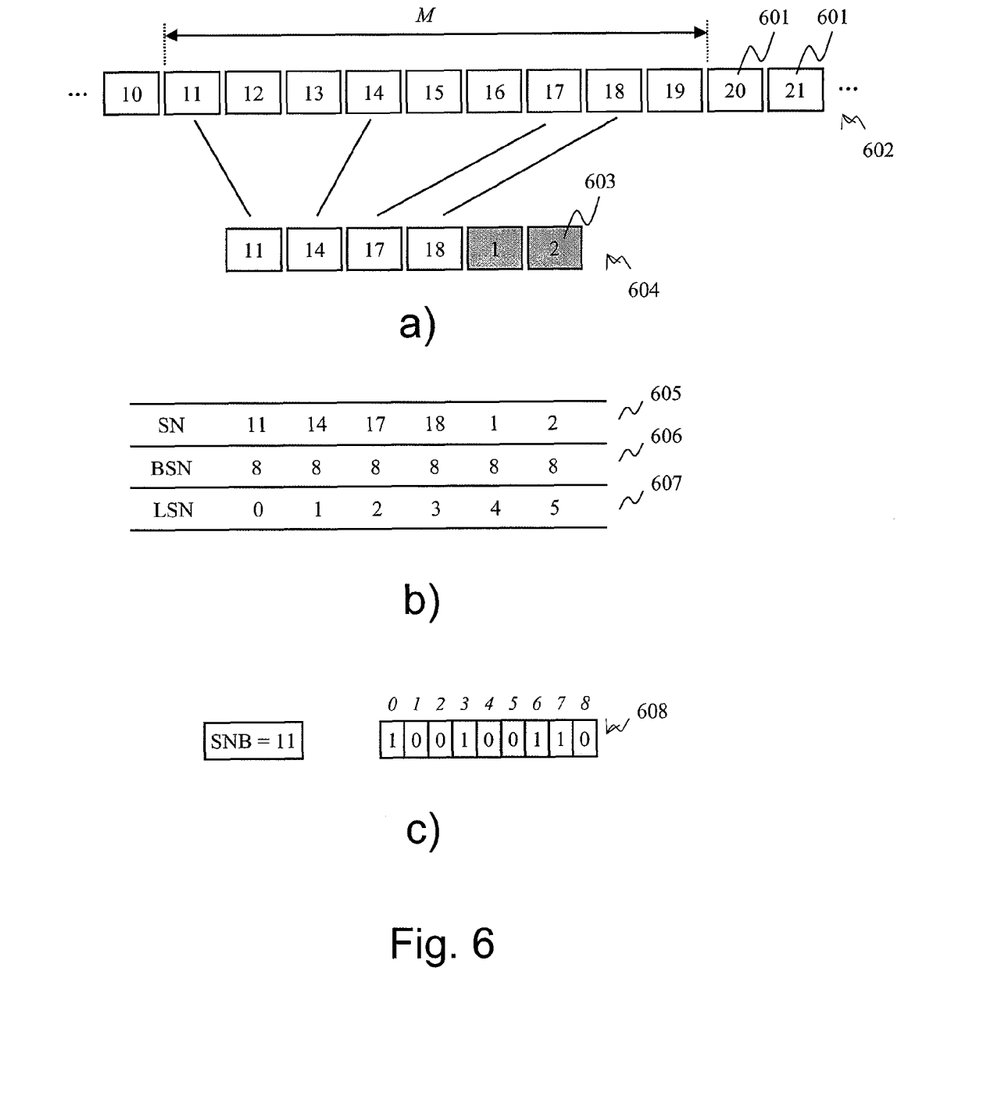
FIGS. 6a, 6b and 6c depict examples of control information that can be transported in the header of a packet.

FIGS. 6a, 6b and 6c depict examples of control information that can be transported in the header of the packets for supporting the transmitting and receiving methods according to the present invention.

All data packets are numbered by using a sequence number (SN) as required by some communication protocols, e.g. TCP, before being transmitted. The sequence number is included in a field of predetermined size located in the header of every packet. Numerals 601 and 605 represent sequence numbers of the stream of data packets 602.

Parity packets can either be sent in the same stream as the data packets or in a separate stream. When sent as a separate stream, the parity packets have their own sequence number space as shown by reference numerals 603. A payload type field could be added in the packets header to differentiate between parity and data.

It should be noted that according to the present invention data packets belonging to a given stream are not all systematically encoded to generate parity packets. Indeed, if there are no unacknowledged data packets there is no need to generate parity packets, although it may be done preventatively. Data block construction depends on the detection of unacknowledged data packets. Consequently, data packets belonging to a data block do not necessarily possess consecutive sequence numbers as indicated by reference 604. In FIG. 6a, data packets 11 and 14 are supposed to be unacknowledged, and data packets 17 and 18 are to be transmitted data packets.

All data packets forming a given data block are taken from a range M of data packets of the main stream 602. M can be set to a predetermined value, the parameters k1 and k2 of the code being then adapted to the number of unacknowledged data packets detected within that range, or variable to reach predetermined values for the parameters k1 and k2 of the code.

Setting the size of the data block is a tradeoff between overhead, delay, and recoverability. If unacknowledged data packets are not frequent, it might be enough to choose a code C(3, 2) which consists of adding one packet to be transmitted to one unacknowledged data packet to generate one parity packet. This operation is repeated for every unacknowledged data packet detected.

A C(3, 2) code can be implemented very simply and efficiently by use of an exclusive-OR operation (XOR). One parity packet is generated by computing a bitwise XOR of one selected data packet and one unacknowledged data packet. The recovery (decoding) of one data packet can be simply performed by repeating the bitwise XOR operation between the parity packet and the other one of the data packets.

FIGS. 6b and 6c represent two alternative solutions for numbering the packets of a data block (in addition to the sequence number SN). Other solutions may also exist.

In FIG. 6b, reference numeral 606 represents a block sequence number (BSN). This sequence number allows the receiving device to distinguish between data packets included in a data block and those which are not, and to not group together data packets belonging to different data blocks. For example, the block sequence number could use 4 bits for numbering from 1 to 15; a specific BSN value (0) could be assigned to data packets not participating to the generation of parity packets. Reference numeral 607 represents a local sequence number (LSN). This sequence number allows the receiving device to position appropriately the corresponding packet within the encoded data block for decoding.

FIG. 6c depicts an alternative solution to associate the parity packets with the data packets used to generate those parity packets by using a bitmask containing M bits (608). If bit i in the bitmask is set to 1, the packet with sequence number SNB+i was used to generate this parity packet. SNB is called the sequence number base, and is sent in the parity packet as well. The bitmask and payload type (parity/data) are sufficient to signal arbitrary parity based forward error correction schemes with little overhead.

The receiving method of packets according to the present invention as to be implemented at the receiving device is illustrated by the flowchart of FIG. 7. This method allows the recovery of missing data packets from a list L of data packets transmitted by the sending device, when sufficient number of parity packets have been received, by avoiding the reception of duplicated data packets.

At step 700, parity and data packets are received by the receiving device. The receiving device uses control information included in the header of the received packets to identify the existence of a block of data (cf. FIG. 6). The block of data is reconstructed based on that control information (701). When packets are detected as missing, their corresponding symbols are marked as erased. The encoded block of data is always partially reconstructed, either because of not transmitted or lost data packets or parity packets, since the aim of the sending device is to transmit just enough information to reach the recoverability threshold for the data packets of the data block.

Considering the missing packets (and thus erased symbols), the sending device determines if enough information is available to recover all missing data packets (702). For example, if a Reed-Solomon code is used to encode k data packets and produces n−k parity packets, all missing packets can be recovered if their number is not greater than n–k (number of parity packets). When using an exclusive or operation, only one packet can be recovered.

Feedback information from the receiving device informs the sending device about the recoverability status of the data block, and thus triggers the transmission by the sending device of further packets if necessary.

If it is determined at step 702 that the data block can be recovered, the recovery is effected at step 703 by decoding the encoded data block using the parity packets. Data packets contained in the data block are then retrieved at step 704 and corresponding acknowledgments are sent to the sending device at step 705.

Advantageously, an acknowledgement sent at the sending step 705 for acknowledging a given data packet contains a flag indicative whether said given data packet has been recovered following the decoding of the encoded block of data.

If it is determined at step 702 that the data block cannot be recovered, the receiving device waits for additional packets belonging to the same encoded data block. When such packets are received (706), they are added to the encoded data block by filling missing positions (707) and then the step 702 is executed again to determine if the recovery is now possible.

Correctly received data packets are always acknowledged by the receiving device. Different strategies can be used however regarding the acknowledgment of parity packets. Preferably, parity packets are acknowledged by the receiving device to make the sending device aware of how far the receiving is device from the recoverability threshold. The sending device will then transmit only the sufficient number of packets in order for the receiving device to be able to recover all the missing data packets by taking into account the parity packets correctly received.

The invention claimed is:

1. A method executed by a transmitting apparatus for transmitting a plurality of data packets to a receiver in a communication system, a processor in the transmitting apparatus executing the steps of:
   transmitting one or more data packets from a list of data packets to be transmitted;
   determining whether an acknowledgment is received for each transmitted data packet; and
   when it is determined at the determining step that an acknowledgement has not been received for at least one data packet, referred to as an unacknowledged data packet, performing the steps of:
      selecting one or more additional data packets from the list of data packets to be transmitted;
      generating one or more parity packets by encoding a block of data containing a combination of the selected one or more additional data packets and at least one unacknowledged data packet using a forward error correction scheme; and
      transmitting at least one of the generated parity packets.

2. The method according to claim 1, further comprising the steps of:
   determining whether an acknowledgment is received for each data packet contained in the block of data; and
   transmitting at least one of the selected data packets if at least one data packet contained in said block of data is unacknowledged.

3. The method according to claim 1, wherein the determining step comprises a step of measuring elapsed time since transmitting a data packet, said data packet being considered as unacknowledged if the elapsed time is greater than a predetermined value.

4. The method according to claim 1, wherein the determining step comprises a step of counting the number of acknowledgements received for data packets transmitted after the transmission of a given data packet, said given data packet being considered as unacknowledged if the counted number is greater than a predetermined value.

5. The method according to claim 1, wherein the forward error correction scheme uses a maximum distance separable code.

6. The method according to claim 5, wherein the number of parity packets transmitted at the transmitting step is at least equal to the number of unacknowledged data packets used to generate said parity packets.

7. The method according to claim 6 wherein the number of parity packets transmitted at the transmitting step, the number of unacknowledged data packets used to generate said parity packets and the number of selected data packets are all equal.

8. The method according to claim 7, wherein the number of parity packets transmitted at the transmitting step, the number of unacknowledged data packets used to generate said parity packets and the number of selected data packets are all equal to one, and wherein one parity packet is generated by computing a bitwise XOR of one selected data packet and one unacknowledged data packet.

9. The method according to any one of claims 5 to 7, wherein the maximum distance separable code is a Reed-Solomon code having parameters n=k1+k2+h and k=k1+k2 over a Galois field of size $2^m$, h1 being the number of parity packets transmitted at the transmitting step, k2 being the number of unacknowledged data packets used to generate said parity packets, k1 being the number of selected data packets, m being the size of the symbols of the code, and h an integer greater than or equal to h1, wherein said code is used for encoding each word j formed by the concatenation of the jth symbol of each data packet.

10. A method executed by a receiving apparatus for receiving a plurality of data packets from a transmitter in a communication system, a processor in the receiving apparatus executing the steps of:
   receiving one or more parity packets from the transmitter, said parity packets having been generated by encoding, using a forward error correction scheme, a block of data containing a combination of a first set of data packets transmitted by the transmitter and a second set of data packets to be transmitted by said transmitter;
   partially reconstructing an encoded block of data associated to the one or more received parity packets based on received data packets belonging to the first and second sets of data packets;
   determining whether the block of data can be recovered by decoding the encoded block of data reconstructed at the reconstructing step; and
   if the block of data can be recovered, sending to the transmitter an acknowledgement corresponding to each data packet included in said recovered block of data.

11. The method according to claim 10, wherein if the block of data cannot be recovered, the following steps are executed:
   receiving one or more additional packets belonging to the encoded block of data; and
   fully reconstructing the encoded block of data by adding the received one or more additional packets to the encoded block of data.

12. The method according to claim 10 or 11, it further comprising the steps of:
   decoding the encoded block of data to recover the block of data; and retrieving data packets contained in the recovered block of data.

13. The method according to claim 10, wherein an acknowledgement sent at the sending step for acknowledging a given data packet contains a flag indicative whether said given data packet has been recovered following the decoding of the encoded block of data.

14. A non-transitory computer-readable medium storing a software application for transmitting a plurality of data packets to a receiver in a communication system, said software application, when executed by a processor, causes the following steps to be performed:
   transmitting one or more data packets from a list of data packets to be transmitted;
   determining whether an acknowledgment is received for each transmitted data packet; and
   when it is determined at the determining step that an acknowledgement has not been received for at least one data packet, referred to as an unacknowledged data packet, performing the steps of:
      selecting one or more additional data packets from the list of data packets to be transmitted;
      generating one or more parity packets by encoding a block of data containing a combination of the selected one or more additional data packets and at least one unacknowledged data packet using a forward error correction scheme; and
      transmitting at least one of the generated parity packets.

15. A non-transitory computer readable medium storing a software application for receiving a plurality of data packets from a transmitter in a communication system, said software application, when executed by a processor, causes the following steps to be performed:
   receiving one or more parity packets from the transmitter, said parity packets having been generated by encoding, using a forward error correction scheme, a block of data containing a combination of a first set of data packets transmitted by the transmitter and a second set of data packets to be transmitted by said transmitter;
   partially reconstructing an encoded block of data associated to the one or more received parity packets based on received data packets belonging to the first and second sets of data packets;
   determining whether the block of data can be recovered by decoding the encoded block of data reconstructed at the reconstructing step; and
   if the block of data can be recovered, sending to the transmitter an acknowledgement corresponding to each data packet included in said recovered block of data.

16. A transmitting device for transmitting a plurality of data packets in a communication system, comprising:
   a processor; and
   a memory storing executable code that, when executed by the processor, causes the transmitting device to perform the steps of:
   transmitting one or more data packets from a list of data packets to be transmitted;
   determining whether an acknowledgment is received for each transmitted data packet;
   when it is determined by the determination unit that an acknowledgement has not been received for at least one data packet, referred to as an unacknowledged data packet:
   selecting one or more additional data packets from the list of data packets to be transmitted;
   generating one or more parity packets by encoding a block of data containing a combination of the selected one or more additional data packets and at least one unacknowledged data packet using a forward error correction scheme; and
   transmitting at least one of the generated parity packets.

17. A receiving device for receiving a plurality of data packets from a transmitter in a communication system, comprising:
   a processor; and
   a memory storing executable code that, when executed by the processor, causes the receiving device to perform the steps of:
   receiving one or more parity packets from the transmitter, said parity packets having been generated by encoding, using a forward error correction scheme, a block of data containing a combination of a first set of data packets transmitted by the transmitter and a second set of data packets to be transmitted by said transmitter;
   partially reconstructing an encoded block of data associated to the one or more received parity packets based on received data packets belonging to the first and second sets of data packets;
   determining whether the block of data can be recovered by decoding the encoded block of data reconstructed at the reconstructing step; and
   sending to the transmitter, if the block of data can be recovered, an acknowledgement corresponding to each data packet included in said recovered block of data.

* * * * *